2,955,918
Patented Oct. 11, 1960

2,955,918
PURIFICATION OF PHOSPHORIC ACID

Robert A. Ruehrwein, Dayton, Ohio, assignor to Monsanto Chemical Company, St. Louis, Mo., a corporation of Delaware No Drawing. Filed Aug. 24, 1956, Ser. No. 605,931

12 Claims. (Cl. 23—165)

This invention relates to the purification of phosphoric acid. In its more specific aspects, it is particularly related to the removal of ferric ions present as an impurity in a wet process phosphoric acid.

Commercially available phosphoric acids are generally manufactured by one of two different methods. One method is the "furnace" or "thermal reduction" method, the other is the "wet process" method. The wet process involves acidulation of phosphate rock with an inorganic acid such as sulfuric acid. In this process considerable amounts of iron compounds are also dissolved from the phosphate rock and remain as soluble impurities in the wet process acid.

For many uses of phosphoric acid, and particularly for the very substantial use in solid fertilizers, the impurities present in wet process acid do not pose a particularly significant problem. In the past few years, however, there has been considerable emphasis placed upon the preparation and use of aqueous solutions of mixed inorganic water-soluble fertilizers prepared by neutralization of phosphoric acid with water-soluble alkaline components such as ammonia, ammonium hydroxide, potassium hydroxide, etc. or mixtures thereof with other materials such as ammonium nitrate, potassium nitrate, sodium nitrate, potassium chloride and the like. During the neutralization of phosphoric acid containing dissolved iron compounds as an impurity, there is a very strong tendency to precipitate these impurities as a sludge-like deposit. These deposits cause trouble by settling and clogging the equipment used for handling and applying the resulting liquid fertilizer solutions. Consequently, it is an object of the present invention to minimize the difficulties by providing a simple and effective way to remove ferric ions from phosphoric acid.

The ferric ion is very difficult to remove from phosphoric acid, probably because of the formation of strong complexes of ferric and phosphate ions. This difficulty is illustrated by the fact that cation exchange resins will not remove ferric ion from phosphate solutions, even when iron is the only metallic ion in the solution. Likewise, extraction with various conventional non-aqueous extractants conventionally used to remove iron from aqueous solutions (for example, ether, ether-thiocyanate mixtures, tributylphosphate, etc.) is not successful—probably also because of the strong complex formation between ferric ion and phosphate ion.

It has now been found, however, that if an appropriate concentration of chloride ion is added to the phosphoric acid, ferric ion can be readily extracted from the phosphoric acid by contacting such acid with a water-insoluble phosphate ester.

The invention can be readily illustrated by reference to the following example.

EXAMPLE

A series of aqueous solutions containing orthophosphoric acid, ferric ion and varying amounts of chloride ion were prepared by making up a stock solution of 6.39 grams of ferric chloride in 100 ml. of 85 percent orthophosphoric acid and diluting each of equal volumes thereof with 1.4 volumes of aqueous potassium chloride solutions of various concentrations. The result was a series of aqueous $H_3PO_4$ solutions having equal volumes and substantially equal concentrations of $P_2O_5$ and ferric ion, but having potassium chloride concentrations ranging from 0 to 3.7 normal. (See Table I.) Each of these aqueous solutions was shaken with an equal volume of tri-n-butyl phosphate and allowed to separate into two phases. Five milliliters of each aqueous phase was neutralized with ammonia (until an odor of ammonia was barely detectable), diluted with water to a volume of 17 cc. and allowed to stand overnight in a 16 mm. inside diameter test tube. The height of precipitated ferric phosphate which settled out at the bottom of the test tube was taken as the measure of ferric ion remaining in the phosphoric acid after extraction with the organic phosphate phase. The following table shows the degree of extraction obtained as a function of chloride concentration of the acid phase.

Table I

| Normality of potassium chloride in acid solution | Height of $FePO_4$ precipitate, in cm. |
|---|---|
| 0 | [1] 3.4 |
| 0.6 | 3.1 |
| 1.0 | 3.0 |
| 2.0 | 2.2 |
| 2.3 | 2.1 |
| 3.0 | 1.2 |
| 3.7 | 0.2 |

[1] Precipitation of $FePO_4$ in same manner but without prior contacting by organic phosphate phase gives same value.

The above-illustrated process is applicable to phosphoric acid of substantially any concentration, although the extraction may not be equally effective in all concentrations. For practical reasons, the invention is more applicable to acids containing between about 5 and about 60 percent $P_2O_5$, and preferably from about 15 to about 55 weight percent $P_2O_5$.

The chloride ion which is an essential factor in the present process can be added in any form, the only necessary precaution being that it be added in a form which will be soluble in the acid to be purified. It is most conveniently added as an ammonium or metal salt, especially as an alkali or alkaline earth metal salt. Typically suitble salts are sodium chloride, calcium chloride, potassium chloride, ammonium chloride, aluminum chloride, etc. When the acid is ultimately going to be used as a fertilizer, ammonium chloride and potassium chloride are especially desirable sources of chloride because the ammonium and potassium ions introduced therewith are of themselves plant nutrient materials. In order to be effective, the chloride ion concentration should be at least 0.1 molar, for example, between about 0.1 and about 9.0 molar. Optimum extraction of ferric ion will generally occur when the chloride ion concentration is between about 1 and about 4 molar.

As stated above, the ferric ion is extracted from the above-described chloride-containing phosphoric acid by contacting such acid with any water-insoluble phosphate ester. Preferred esters are the normal (i.e., tri-substituted) esters, and especially the symmetrical normal esters, but unsymmetrical triesters as well as water-insoluble mono- and diesters are also useful. The preferred esterifying groups in such esters will be hydrocarbyl groups (especially alkyl groups), but polar substituents such as halo, alkoxy, nitro, amino and other non-interfering groups which will not react with the phosphoric acid solution being extracted can be present without altering the essential effectiveness of the phosphate ester extractant.

Examples of typically suitable esters are tri-n-propyl phosphate, tri-n-butyl phosphate, tri-t-butyl phosphate, triamyl phosphate, tricyclohexyl phosphate, tri-2-ethylhexyl phosphate, tri-n-octyl phosphate, tri-nonyl phosphate (e.g., from the oxo alcohol of a butylene dimer), tri-n-decyl phosphate, tri-n-dodecyl phosphate, tris-tridecyl phosphate (e.g., from the oxo alcohol of a butylene trimer or a propylene tetramer), triphenyl phosphate, tricresyl phosphate, tri-2,4-xylyl phosphate, trixenyl phosphate, tri-α-naphthyl phosphate, tri-(ethylphenyl) phosphate, tribenzyl phosphate, di-n-butyl-n-octyl phosphate, dicresylphenyl phosphate, n-decyl-di-2-ethylhexyl phosphate, dicyclohexylmethyl phosphate, 2,3-dichloropropyl-di-n-octyl phosphate, tri-4-chlorophenyl phosphate, di-2,4-dinitrophenyl-n-dodecyl phosphate, di-n-octyl hydrogen phosphate, n-octadecyl dihydrogen phosphate and the like. In the case of phosphates which are normally solid at room temperature, they can be used either at higher temperatures or in solutions of water immiscible solvents such as xylene, benzene, gasoline, kerosene, etc.

The term "water-insoluble," as used herein with respect to the phosphate esters and ester solvents, does not necessarily require complete insolubility. It merely requires that the material be sufficiently immiscible with the water-soluble phosphoric acid phase to allow physical separation of the liquids into two distinct phases. It will be readily recognized that an ideal extractant phase will be completely immiscible with the phase being extracted—and that all other things being equal a less miscible extractant will be more desirable than a more miscible extractant. However, practical considerations of cost, distribution factors, etc., will generally make it expedient to use an extractant having a finite though quite small miscibility with the acid phase.

I claim:

1. The method of removing from phosphoric acid trivalent iron impurities dissolved therein, which method comprises dissolving in said phosphoric acid sufficient chloride ion to obtain at least a 0.1 molar concentration thereof in said acid, contacting said acid with a water-insoluble phosphate ester in a liquid form sufficiently immiscible with said acid and in sufficient amount to form a separate liquid phase in contact with said acid whereby a substantial proportion of said iron in the acid phase is extracted from said acid phase into the liquid phosphate ester phase, and thereafter separating said ester phase from said acid phase.

2. The method of claim 1 wherein the chloride ion concentration is between about 0.1 and about 9.0 molar.

3. The method of claim 1 wherein the phosphate ester is a trihydrocarbyl ester of phosphoric acid.

4. The method of claim 1 wherein the chloride ion concentration is between about 0.5 and about 3.0 molar.

5. The method of claim 1 wherein the phosphate ester is a trialkyl ester of phosphoric acid.

6. The method of claim 1 wherein the chloride ion concentration is between about 0.5 and about 3.0 molar and the phosphate ester is a trialkyl ester of phosphoric acid.

7. The method of claim 1 wherein the chloride ion concentration is between about 0.5 and 3.0 molar and the phosphate ester is tri-n-butyl phosphate.

8. The method of removing from phosphoric acid trivalent iron impurities dissolved therein, which method comprises dissolving in said phosphoric acid sufficient sodium chloride to obtain a concentration thereof in said acid between about 0.1 and 9.0 molar, contacting said acid with a water-insoluble trialkyl ester of phosphoric acid in a liquid form sufficiently immiscible with said acid and in sufficent amount to form a separate liquid phase in contact with said acid whereby a substantial proportion of said iron in the acid phase is extracted from said acid phase into the liquid phosphate ester phase, and thereafter separating said ester phase from said acid phase.

9. The method of removing from phosphoric acid trivalent iron impurities dissolved therein, which method comprises dissolving in said phosphoric acid sufficient calcium chloride to obtain a concentration thereof in said acid between about 0.1 and 9.0 molar, contacting said acid with a water-insoluble trialkyl ester of phosphoric acid in a liquid form sufficiently immiscible with said acid and in sufficient amount to form a separate liquid phase in contact with said acid whereby a substantial proportion of said iron in the acid phase is extracted from said acid phase into the liquid phosphate ester phase, and thereafter separating said ester phase from said acid phase.

10. The method of removing from phosphoric acid trivalent iron impurities dissolved therein, which method comprises dissolving in said phosphoric acid sufficient potassium chloride to obtain a concentration thereof in said acid between about 0.1 and 9.0 molar, contacting said acid with a water-insoluble trialkyl ester of phosphoric acid in liquid form sufficiently immiscible with said acid and in sufficient amount to form a separate liquid phase in contact with said acid whereby a substantial proportion of said iron in the acid phase is extracted from said acid phase into the liquid phosphate ester phase, and thereafter separating said ester phase from said acid phase.

11. The method of removing from phosphoric acid trivalent iron impurities dissolved therein, which method comprises dissolving in said phosphoric acid sufficient ammonium chloride to obtain a concentration thereof in said acid between about 0.1 and 9.0 molar, contacting said acid with a water-insoluble trialkyl ester of phosphoric acid in a liquid form sufficiently immiscible with said acid and in sufficent amount to form a separate liquid phase in contact with said acid whereby a substantial proportion of said iron in the acid phase is extracted from said acid phase into the liquid phosphate ester phase, and thereafter separating said ester phase from said acid phase.

12. The method of removing from phosphoric acid trivalent iron impurities dissolved therein, which method comprises dissolving in said phosphoric acid sufficient aluminum chloride to obtain a concentration thereof in said acid between about 0.1 and 9.0 molar, contacting said acid with a water-insoluble trialkyl ester of phosphoric acid in a liquid form sufficiently immiscible with said acid and in sufficent amount to form a separate liquid phase in contact with said acid whereby a substantial proportion of said iron in the acid phase is extracted from said acid phase into the liquid phosphate ester phase, and thereafter separating said ester phase from said acid phase.

References Cited in the file of this patent

UNITED STATES PATENTS

| | | |
|---|---|---|
| 1,018,746 | Dittmar | Feb. 27, 1912 |
| 1,857,470 | Milligan et al. | May 10, 1932 |
| 2,733,200 | Kunin | Jan. 31, 1956 |
| 2,859,092 | Bailes et al. | Nov. 4, 1958 |